(12) United States Patent
Sridhara et al.

(10) Patent No.: US 11,620,605 B2
(45) Date of Patent: Apr. 4, 2023

(54) SUMMARIZING BUSINESS PROCESS MODELS

(71) Applicant: International Business Machines Corporation, Armonk, NY (US)

(72) Inventors: Giriprasad Sridhara, Bangalore (IN); Neelamadhav Gantayat, Hebbal (IN); Sampath Dechu, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 16/597,687

(22) Filed: Oct. 9, 2019

(65) Prior Publication Data
US 2021/0110317 A1   Apr. 15, 2021

(51) Int. Cl.
| | | |
|---|---|---|
| G06Q 10/06 | (2012.01) | |
| G06F 40/30 | (2020.01) | |
| G06Q 10/067 | (2023.01) | |
| G06Q 10/0633 | (2023.01) | |

(52) U.S. Cl.
CPC .......... *G06Q 10/067* (2013.01); *G06F 40/30* (2020.01); *G06Q 10/0633* (2013.01)

(58) Field of Classification Search
None
See application file for complete search history.

(56) References Cited

U.S. PATENT DOCUMENTS

| | | | |
|---|---|---|---|
| 5,136,705 A | 8/1992 | Stubbs et al. | |
| 7,120,931 B1 | 10/2006 | Cheriton | |
| 2009/0070698 A1 | 3/2009 | Shurtleff et al. | |
| 2012/0062574 A1* | 3/2012 | Dhoolia | G06V 30/422 345/506 |
| 2014/0278690 A1* | 9/2014 | Agarwal | G06Q 10/0633 705/7.22 |
| 2015/0032499 A1* | 1/2015 | Duftler | G06Q 10/0633 |

(Continued)

FOREIGN PATENT DOCUMENTS

CN    102541880 A    7/2012

OTHER PUBLICATIONS

Castillo, "Business process model refactoring applying IBUPROFEN," Jan. 2019, Journal of Systems and Software, vol. 147, pp. 86-103 (Year: 2019).*

(Continued)

*Primary Examiner* — Ivan R Goldberg
(74) *Attorney, Agent, or Firm* — Ference & Associates LLC (57) ABSTRACT

One embodiment provides a method, including: obtaining a business process model representing a process flow having a plurality of steps for performing a business process, the business process model being a graphical representation of the process flow and including geometrical shapes representing activities of the process flow and edges representing a temporal ordering of the activities of the process flow; identifying important activities of the business process model; and generating a summary business process model from the business process model, wherein the summary business process model comprises nodes representing the important activities and excludes other nodes included within the business process model.

11 Claims, 2 Drawing Sheets

(56) References Cited

U.S. PATENT DOCUMENTS

| | | | |
|---|---|---|---|
| 2016/0035114 A1* | 2/2016 | Hesse | G06T 11/206 |
| | | | 345/440 |
| 2016/0063422 A1* | 3/2016 | Chen | G06Q 10/067 |
| | | | 705/7.26 |
| 2018/0060779 A1* | 3/2018 | Suri | G06Q 10/06316 |
| 2018/0107957 A1 | 4/2018 | Jambor-Sadeghi | |

OTHER PUBLICATIONS

Liu, "Enabling effective workflow model reuse: A data-centric approach," 2017, Decision Support Systems, vol. 93, pp. 11-25 (Year: 2017).*

Polyvyanyy, et al, "Business process model abstraction," in Handbook on Business Process Management, 2015, Springer, pp. 147-165 (Year: 2015).*

Ralph Bobrik et al., "Parameterizable Views for Process Visualization", Sep. 2007, 18 pages, ResearchGate.

* cited by examiner

SUMMARIZING BUSINESS PROCESS MODELS

BACKGROUND

Business processes are employed by entities and people. Generally, a business process is any type of process that has more than one step. In other words, a business process can range from something as simple as a process for tying a shoe to something as complicated as a process for building a skyscraper. Many of these business processes are defined by a process flow that identifies the steps that are to be performed, an order of the steps to be performed, any entity that is responsible for a particular step, and the like. This process flow, and, thereby, the business process, may be graphically represented using a process flow diagram (e.g., business process model, unified modeling language activity diagram, etc.) that uses different shapes for representing different types of tasks or steps (e.g., rectangles for performing tasks, diamonds for decision tasks, etc.), edges for connecting the shapes to delineate a connection between tasks, edges with arrows to designate a temporal order of the tasks, swimlanes that designate responsible entities, and the like.

BRIEF SUMMARY

In summary, one aspect of the invention provides a method, comprising: obtaining a business process model representing a process flow having a plurality of steps for performing a business process, the business process model being a graphical representation of the process flow and including geometrical shapes representing activities of the process flow and edges representing a temporal ordering of the activities of the process flow; identifying important activities of the business process model; and generating a summary business process model from the business process model, wherein the summary business process model comprises nodes representing the important activities and excludes other nodes included within the business process model.

Another aspect of the invention provides an apparatus, comprising: at least one processor; and a computer readable storage medium having computer readable program code embodied therewith and executable by the at least one processor, the computer readable program code comprising: computer readable program code configured to obtain a business process model representing a process flow having a plurality of steps for performing a business process, the business process model being a graphical representation of the process flow and including geometrical shapes representing activities of the process flow and edges representing a temporal ordering of the activities of the process flow; computer readable program code configured to identify important activities of the business process model; and computer readable program code configured to generate a summary business process model from the business process model, wherein the summary business process model comprises nodes representing the important activities and excludes other nodes included within the business process model.

An additional aspect of the invention provides a computer program product, comprising: a computer readable storage medium having computer readable program code embodied therewith, the computer readable program code executable by a processor and comprising: computer readable program code configured to obtain a business process model representing a process flow having a plurality of steps for performing a business process, the business process model being a graphical representation of the process flow and including geometrical shapes representing activities of the process flow and edges representing a temporal ordering of the activities of the process flow; computer readable program code configured to identify important activities of the business process model; and computer readable program code configured to generate a summary business process model from the business process model, wherein the summary business process model comprises nodes representing the important activities and excludes other nodes included within the business process model.

A further aspect of the invention provides a method, comprising: obtaining a business process model representing a process flow having a plurality of steps for performing a business process, the business process model being a graphical representation of the process flow and including geometrical shapes representing activities of the process flow and edges representing a temporal ordering of the activities of the process flow; receiving a user query identifying an area of the business process model to focus on; matching the user query to a plurality of nodes of the business process model; identifying, using a flooding technique, a shortest path between a first of the plurality of nodes and a last of the plurality of nodes; identifying important activities of the business process model within the path identified; and generating a summary business process model from the business process model for the path identified, wherein the summary business process model comprises nodes representing the important activities within the path and excludes other nodes included within the business process model within the path.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, most if not all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

Typical business process models are very complicated and include many different activities represented by geometrical shapes and connections between the different activities represented by edges. A traditional business process model includes an activity shape for each possible activity that can occur within the business process. Additionally, edges are used to connect activities to illustrate a temporal ordering of the activities. In order to be precise, the business process model has every possible activity that could occur within the process. However, since many business processes include many different possible activities, the business process models become very complicated. For example, a business process model for a fairly simple process can have twenty or more activities.

As the business process gets more complicated and includes more activities, the model can easily have more than a hundred activities, which results in a very cluttered business process diagram. Some of these complicated business process models even require a user to scroll within a window to see some activities within the process because the business process model will not fit on a single display screen. While these business process models are very useful for identifying each possible step in the process, for someone who is attempting to get a quick overview of the process, the model is simply too complicated and includes too many details to be useful. Currently there is no technique for summarizing business process models to provide a quick overview of the business process.

Accordingly, an embodiment provides a system and method for summarizing business process models by identifying important activities within a business process model and creating a summary business process model utilizing the important activities. The system obtains a business process model that represents a process flow. This business process model is identified as a business process model that needs to be summarized. The system identifies the important activities within the business process model, using one or more of a plurality of techniques to identify the important activities. Utilizing the important activities, the system generates a summary business process model. The summary business process model includes the activities that were classified or designated as important and excludes other activities that were included in the obtained business process model. The system can then output the summary business process model, thus providing a simpler business process model that still includes the details necessary for understanding the business process model but that is simpler and does not require as much time to digest in order to understand the overall concept of the larger business process model.

The obtained business process model may also be based upon a user query that identifies a business process model and a portion of the business process model that the user wants to focus on. The system can match the user query to nodes within the business process model. Once the matching nodes are identified, the system identifies the shortest path that can be traversed between a starting node of the matching nodes and an ending node of the matching nodes. The system then identifies the important activities within the shortest path and utilizes these activities to generate the summary business process model.

Such a system provides a technical improvement over current systems for business process models. Rather than relying on a user to digest the very complicated business process model, the described system and method provides a technique for summarizing the business process model into a summary business process model that is more user-friendly. Similar to summarizing a text document, the described system and method identifies the important portions of the business process model and includes those activities corresponding to the important portions within the summary business process model. Thus, the user is able to quickly identify, from the included activities, the overall concept and objective of the business process model. Accordingly, the described system and method provides a technique that allows a user to spend less time analyzing the more complicated business process model.

Figure 1:
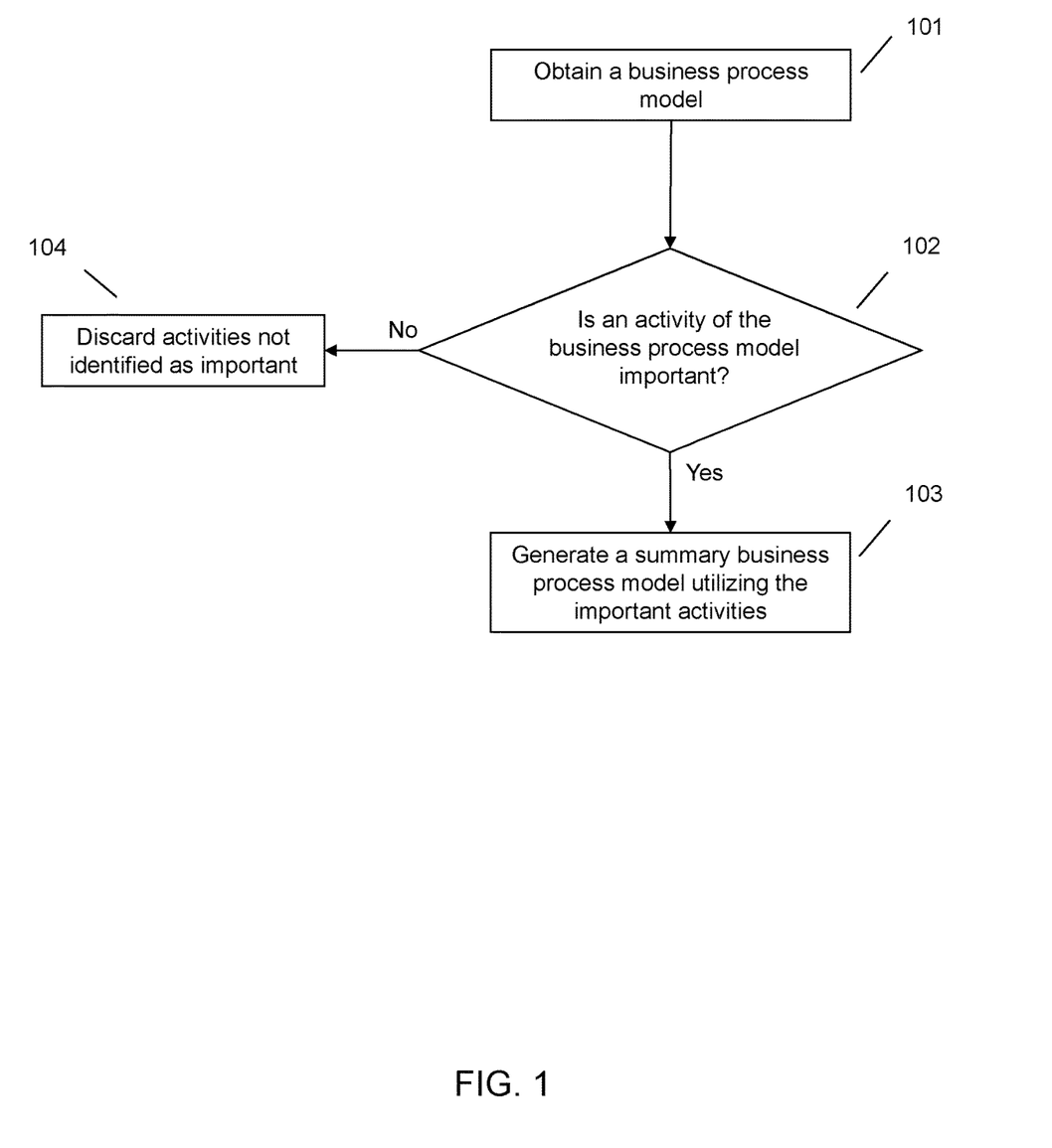
FIG. 1 illustrates a method of summarizing business process models by identifying important activities within a business process model and creating a summary business process model utilizing the important activities.

FIG. 1 illustrates a method for summarizing business process models by identifying important activities within a business process model and creating a summary business process model utilizing the important activities. At 101, the system obtains a business process model representing a process flow having a plurality of steps for performing a business process. A business process may be any type of process that may be defined using a process map, business process model, or procedure steps. For example, a business process may be related to a service provided by an entity, for example, loan approvals, vehicle registrations, invoice processing, infrastructure or building planning, scheduling, or the like. As another example, a business process may be related to a method or steps that are carried out by an entity (e.g., user, corporation, etc.). For example, a business process may be related to steps for withdrawing money from an automated teller machine (ATM), the steps required for hiring a new employee, or the like.

The business process may be defined by a process flow that identifies the different steps for performing the business process, the temporal ordering of the steps, steps requiring input from other steps, users responsible for particular steps, and any other parameters required for proper performance of the business process. Thus, the business process model includes a graphical representation of the process flow, activities within the process flow, temporal ordering of the steps, and the like. Activities within a business process model are generally represented by geometrical shapes. Different types of activities are generally represented by different shapes, for example, rectangles for performing activities, diamonds for decision activities, and the like. Activities having a relationship are connected by edges. If the activities have a temporal ordering or dependency (e.g., one activity has to occur before another, etc.), these activities are generally connected by edges having arrows.

Additionally, traditional business process model graphical representations may include swimlanes. Swimlanes include groupings of tasks. Depending on the type of business process model, the groupings may be based upon different criteria. For example, in some business process models, the groupings, and, therefore, the swimlanes, are based upon the responsible entities or user. For example, all the tasks that are to be performed by a project manager would be grouped in a swimlane that corresponds to the project manager. As another example, tasks to be performed by an engineer would be grouped into a different swimlane that corresponds to the engineer. Other business process models may group the activities based upon a larger activity set. For example, if the business process model is directed to paying a vendor, this business process model may include three different larger activity sets, each represented by a swimlane. Each of these activity sets may then include activities that are represented within the business process model as shapes, with the activities of an activity set being included in the swimlane corresponding to the activity set.

At 102 the system determines if an activity of the business process model is an important activity. To determine whether an activity is important, the system may use one or more techniques. One technique includes using one or more natural language processing techniques. The system analyzes the text included within an activity of the business process model. The system may compare the text of the activity to other text included in the business process model, for example, a swimlane title, business process model title, and the like. Using similarity measure techniques, for example, cosine similarity, distance measurements, utilizing vector space models, and the like, the system can identify a similarity of the activity text to other text within the business process model. An activity having text that is very similar to other text of the business process model may be designated or classified as an important activity. The system may also generate a similarity score for the activity based upon the similarity computation. This score may be stored as a feature corresponding to the activity. As an example, assume one of the activities included in the business process model is "index invoice". If the swimlane label is "Invoice Indexing", the system would identify that the activity "index invoice" has a high similarity to the swimlane label and would identify this activity as important.

Another technique for identifying an activity as important is to extract text from the activities in the business process model. The extracted text can then be used to create sentences. The system can then apply natural language text summarization techniques to extract the important sentences from the created sentences. Once the important sentences are identified, the system can identify which activity corresponds to the important sentences. For example, the system may compare the text of the sentences designated as important to the text of the activity. The activities having the text corresponding to the important sentences can then be designated or classified as important. The system can also generate a summary score for the activity based upon whether the activity corresponds to one of the important sentences. This score may be stored as a feature corresponding to the activity.

As an example, assume the business process model includes the following activities "Receive Invoice," "Validate Invoice," "Invoice Valid?" "Send message to vendor", and "Index Invoice." The system extracts the text and creates the following collated sentences: "Receive invoice. Validate invoice. Invoice valid? No. Send message to vendor. Yes. Index invoice." Using a natural language text summarization technique, the system identifies the sentences "Receive invoice." and "Index invoice." as important. Thus, the activities corresponding to these sentences are identified as important.

Another technique for identifying an activity as important includes using a graph analysis technique. This technique treats the business process model as a graph and finds graph centrality measures, for example, PageRank, Betweenness, and the like. Nodes, which correspond to the activities, that have higher graph centrality measures as compared to other nodes are designated or classified as important. The system may also generate a graph centrality score for the activity based upon the graph centrality measure for the activity. This score may be stored as a feature corresponding to the activity.

Another technique for identifying an activity as important is to identify unimportant activities. In other words, the system can exclude the unimportant activities, thereby leaving activities that could be important. To identify an activity as unimportant, the system may compare the text of the activity to a predefined dictionary of terms that have been identified as unimportant. For example, if an activity includes the term "validate" and this term is included in the unimportant term dictionary, then the activity would be designated or classified as unimportant. The unimportant term dictionary may be created by subject matter experts. Another method for identifying an activity as unimportant is to analyze the control flow of the business process. Some sub-processes or routines included in the business process will be unimportant. For example, exception handling activities will only be performed if some criteria is met, thereby making these activities generally unimportant to a summary of the business process. Therefore, the activities included in the exception handling routine, or other routine or sub-process that is identified as unimportant, can be classified as unimportant. The system can also generate an unimportant score for the activity based upon whether the activity is identified as unimportant or not. This score may be stored as a feature corresponding to the activity.

The system may also employ a machine-learning model to determine if an activity is important. The machine-learning model may be a trained classifier that is able to determine if an activity is important. The classifier may use the features of the activities (e.g., unimportant feature, graph centrality measure feature, summary feature, similarity score feature, etc.) to determine whether the activity is important. The classifier may first be trained using a manually annotated training set. Once the classifier is trained, the classifier can then predict whether an activity should be identified as important and included in the summary. The different features may also be weighted within the classifier. For example, a user may determine that the unimportant feature should have less weight than the summary feature with respect to the classifier.

If an activity is not identified as important at 102, the system may discard the activity at 104. In other words, the system will not include that activity in the summary. On the other hand, if the activity is identified as important at 102, the system may include the activity in the summary business process model. Thus, at 103, the system may generate a summary business process model utilizing the activities identified as important and excluding the other activities or nodes of the business process model (i.e., the activities not identified as important). The summary business process model may simply be a simpler version of the business process model and include fewer activities and edges. In other words, the summary business process model still looks like a traditional business process model including activities and edges, but just includes fewer activities and edges than the business process model obtained at 101.

In generating the summary business process model, the system may perform some post-processing on the activities identified as important to further simplify the summary business process model. For example, the system may cluster nodes representing similar activities, for example, as determined using similarity techniques, into a single anchor activity. The single anchor activity would then be included in the summary business process model, as opposed to the nodes that represented the similar activities. As another example, the system may identify if adjacent nodes have an entailment relationship, which identifies whether one activity entails another. If one activity does entail another activity, then the entailed activity can be removed from the summary business process model. For example, an activity of "prepare meeting notes" would require an activity of "attend meeting." Thus, the "attend meeting" activity is entailed by the "prepare meeting notes" activity and can be removed. The system can also use graph clustering algorithms to simplify the summary business process model.

The summary business process model may also be generated based upon a user query. The user query may identify a particular portion of the business process model that the user would like to focus on. Thus, the system may receive a user query that identifies this portion or area that is of interest to the user. The system may match the user query or intent to some of the nodes within the business process model, for example, using a text similarity technique, using a natural language classifier, or the like. Once the intent or nodes are identified, the system identifies a first or starting node of the group of nodes and a last or ending node of the group of nodes. The system then identifies a node path, or path, between the starting node and the ending node. The system may use graph traversal techniques, for example, a flooding technique, to identify the shortest path between the starting node and the ending node. Once the path of nodes is identified, the system may use the techniques discussed herein to identify the important nodes within the path. These important nodes can then be used to generate a summary business process model for the portion or area of the business process model that is was identified by the user.

Figure 2:
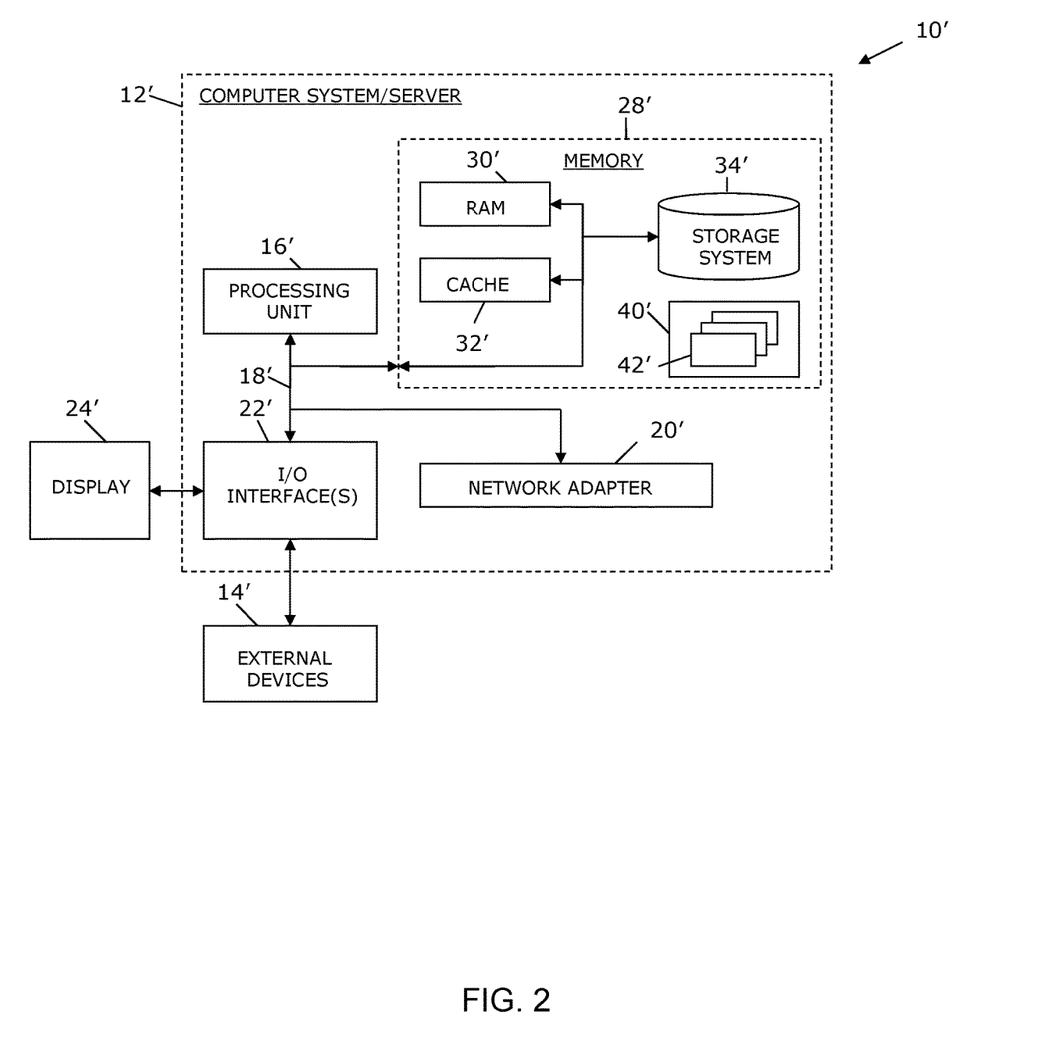
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:

obtaining, utilizing a processor of a computing system, a business process model representing a process flow having a plurality of steps for performing a business process, the business process model being a graphical representation of the process flow and including geometrical shapes representing activities of the process flow and edges representing a temporal ordering of the activities of the process flow;

receiving, utilizing the processor, a user query identifying a portion of the business process model to focus on;

identifying, utilizing the processor, nodes of the portion of the business model by matching the user query to nodes of the business process model;

classifying, utilizing the processor, nodes of the portion as important activities utilizing graph centrality measures to designate nodes having higher graph centrality measures as compared to other nodes as important activities;

extracting, utilizing at least one natural language processing technique, text from the geometrical shapes, the nodes, and from other elements within the business process model portion corresponding to the user query;

(i) identifying, using a similarity measure technique, a similarity of extracted text to other extracted text within the business process model, (ii) assigning a similarity score, computed from the identifying a similarity, to a corresponding geometrical shape as a feature of the corresponding geometrical shape, wherein a geometrical shape having corresponding text identified as having a similarity to the other extracted text within the business process model has a higher similarity score than a geometrical shape having corresponding text identified as not having a similarity to the other extracted text within the business process model, (iii) and classifying, utilizing a machine-learning model, activities having higher similarity scores as identified by the machine-learning model as important activities based upon at least the similarity score feature of the geometrical shapes;

(i) creating sentences of the extracted text, (ii) summarizing, by applying a natural language text summarization technique the sentences, extracting, by summarizing the sentences using a natural language text summarization technique, important sentences from the sentences, and (iii) classifying an activity as an important activity based upon the activity matching one of the important sentences;

generating, utilizing the processor, a summary business process model from the portion of the business process model and responsive to the user query, the summary business process model comprising nodes representing the important activities from (i) the graph centrality measures, (ii) the similarity score features, and (iii) the important sentences and excluding other nodes included within the portion of the business process model;

the generating the summary business process model comprising performing post-processing on the nodes representing the important activities by (i) generating a single anchor activity from similar activities classified as important activities by clustering the nodes representing the important activities into similar activities, (ii) removing nodes representing important activities entailed within another of the nodes representing important activities, and (iii) simplifying, utilizing a graph clustering algorithm, the summary business process model; and providing, utilizing the processor, the summary business process model to a user.

2. The method of claim 1, comprising (i) comparing text of the activity represented by a node to other text included in the business process model and (ii) designating an activity as important responsive to identifying, from the comparing, a similarity between the text of the activity and the other text.

3. The method of claim 1, comprising (i) identifying unimportant activities and (ii) excluding the unimportant activities from the summary business process model.

4. The method of claim 3, wherein the identifying unimportant activities comprises (i) comparing text of the activity to a dictionary comprising text corresponding to unimportant activities and (ii) classifying an activity as unimportant responsive to identify a match based upon the comparing.

5. The method of claim 3, wherein the identifying unimportant activities comprises (i) analyzing the process flow, (ii) identifying a portion of the process flow as unimportant, and (iii) classifying activities within the portion as unimportant activities.

6. The method of claim 1, comprising identifying a node path beginning at a starting node of the nodes and ending at an ending node of the nodes.

7. An apparatus, comprising:

at least one processor of a computing system; and a computer readable storage medium having computer readable program code embodied therewith and executable by the at least one processor, the computer readable program code comprising:

computer readable program code configured to obtain, using the at least one processor, a business process model representing a process flow having a plurality of steps for performing a business process, the business process model being a graphical representation of the process flow and including geometrical shapes representing activities of the process flow and edges representing a temporal ordering of the activities of the process flow;

computer readable program code configured to receive, utilizing the at least one processor, a user query identifying a portion of the business process model to focus on;

computer readable program code configured to identify, utilizing the at least one processor, nodes of the portion of the business model by matching the user query to nodes of the business process model;

computer readable program code configured to classify, using the at least one processor, nodes of the portion as important activities utilizing graph centrality measures to designate nodes having higher graph centrality measures as compared to other nodes as important activities;

computer readable program code configured to extract, utilizing at least one natural language processing technique, text from the geometrical shapes, the nodes, and from other elements within the business process model portion corresponding to the user query;

computer readable program code configured to (i) identify, using a similarity measure technique, a similarity of extracted text to other extracted text within the business process model, (ii) assign a similarity score, computed from the identifying a similarity, to a corresponding geometrical shape as a feature of the corresponding geometrical shape, wherein a geometrical shape having corresponding text identified as having a similarity to the other extracted text within the business process model has a higher similarity score than a geometrical shape having corresponding text identified as not having a similarity to the other extracted text within the business process model, classify, utilizing a machine-learning model, activities having higher similarity scores as identified by the machine-learning model as important activities based upon at least the similarity score feature of the geometrical shapes;

computer readable program code configured to (i) create sentences of the extracted text, (ii) summarize, by applying a natural language text summarization technique the sentences, extracting, by summarizing the sentences using a natural language text summarization technique, important sentences from the sentences, and (iii) classify an activity as an important activity based upon the activity matching one of the important sentences;

computer readable program code configured to generate, using the at least one processor, a summary business process model from the portion of the business process model and responsive to the user query, the summary business process model comprising nodes representing the important activities and excluding other nodes included within the portion of the business process model;

the generating the summary business process model comprising performing post-processing on the nodes representing the important activities by (i) generating a single anchor activity from similar activities classified as important activities by clustering the nodes representing the important activities into similar activities, (ii) removing nodes representing important activities entailed within another of the nodes representing important activities, and (iii) simplifying, utilizing a graph clustering algorithm, the summary business process model; and computer readable program code configured to provide, using the at least one processor, the summary business process model to a user.

8. A computer program product, comprising:
a computer readable storage medium having computer readable program code embodied therewith, the computer readable program code executable by a processor of a computing system and comprising:

computer readable program code configured to obtain, using the at least one processor, a business process model representing a process flow having a plurality of steps for performing a business process, the business process model being a graphical representation of the process flow and including geometrical shapes representing activities of the process flow and edges representing a temporal ordering of the activities of the process flow;

computer readable program code configured to receive, utilizing the at least one processor, a user query identifying a portion of the business process model to focus on;

computer readable program code configured to identify, utilizing the at least one processor, nodes of the portion of the business model by matching the user query to nodes of the business process model;

computer readable program code configured to classify, using the at least one processor, nodes of the portion as important activities utilizing graph centrality measures to designate nodes having higher graph centrality measures as compared to other nodes as important activities;

computer readable program code configured to extract, utilizing at least one natural language processing technique, text from the geometrical shapes, the nodes, and from other elements within the business process model portion corresponding to the user query;

computer readable program code configured to (i) identify, using a similarity measure technique, a similarity of extracted text to other extracted text within the business process model, (ii) assign a similarity score, computed from the identifying a similarity, to a corresponding geometrical shape as a feature of the corresponding geometrical shape, wherein a geometrical shape having corresponding text identified as having a similarity to the other extracted text within the business process model has a higher similarity score than a geometrical shape having corresponding text identified as not having a similarity to the other extracted text within the business process model, classify, utilizing a machine-learning model, activities having higher similarity scores as identified by the machine-learning model as important activities based upon at least the similarity score feature of the geometrical shapes;

computer readable program code configured to (i) create sentences of the extracted text, (ii) summarize, by applying a natural language text summarization technique the sentences, extracting, by summarizing the sentences using a natural language text summarization technique, important sentences from the sentences, and (iii) classify an activity as an important activity based upon the activity matching one of the important sentences;

computer readable program code configured to generate, using the at least one processor, a summary business process model from the portion of the business process model and responsive to the user query, the summary business process model comprising nodes representing the important activities and excluding other nodes included within the portion of the business process model;

the generating the summary business process model comprising performing post-processing on the nodes representing the important activities by (i) generating a single anchor activity from similar activities classified as important activities by clustering the nodes representing the important activities into similar activities, (ii) removing nodes representing important activities entailed within another of the nodes representing important activities, and (iii) simplifying, utilizing a graph clustering algorithm, the summary business process model; and computer readable program code configured to provide, using the at least one processor, the summary business process model to a user.

9. The computer program product of claim 8, comprising (i) comparing text of the activity represented by a node to other text included in the business process model and (ii) designating an activity as important responsive to identifying, from the comparing, a similarity between the text of the activity and the other text.

10. The computer program product of claim 8, comprising (i) identifying unimportant activities and (ii) excluding the unimportant activities from the summary business process model.

11. The computer program product of claim 10, wherein the identifying unimportant activities comprises (i) analyzing the process flow, (ii) identifying a portion of the process flow as unimportant, and (iii) classifying activities within the portion as unimportant activities.

\* \* \* \* \*